United States Patent [19]

Grossglauser et al.

[11] Patent Number: 5,604,731
[45] Date of Patent: Feb. 18, 1997

[54] RENEGOTIATED BIT-RATE SERVICE SYSTEM AND METHOD

[75] Inventors: Matthias Grossglauser, Sophia-Antipolis, France; Srinivasan Keshav, Berkeley Heights; David Tse, New Providence, both of N.J.

[73] Assignee: Lucent Technologies Inc., Murray Hill, N.J.

[21] Appl. No.: 424,844

[22] Filed: Apr. 19, 1995

[51] Int. Cl.$^6$ .................................................. H04L 12/26
[52] U.S. Cl. .......................................... 370/232; 370/468
[58] Field of Search .................................. 370/17, 79, 84, 370/110.1

[56] References Cited

U.S. PATENT DOCUMENTS

| | | | |
|---|---|---|---|
| 5,081,620 | 2/1990 | Girard et al. | 370/60 |
| 5,163,042 | 11/1992 | Ochiai | 370/17 |
| 5,280,470 | 1/1994 | Buhrke et al. | 370/17 X |
| 5,446,730 | 8/1995 | Lee et al. | 370/17 X |

OTHER PUBLICATIONS

Song Chong, San–qi Li and Joydeep Ghosh, "Predictive Dynamic Bandwidth Allocation for Efficient Transport of Real–Time VBR Video over ATM," IEEE Journal on Selected Areas in Communications, vol. 13, No. 1, Jan. 1995.

*Primary Examiner*—Melvin Marcelo
*Attorney, Agent, or Firm*—Robert P. Marley

[57] ABSTRACT

A data transmission system and method employing either a renegotiated variable bit-rate ("RVBR") network or a renegotiated constant bit-rate ("RCBR") network. Within these networks, data transmission rates between a sender and a recipient are rapidly renegotiated as a function of previously stored data transmission rate information and system buffer levels. Such a system and method can be readily implemented within existing CBR and/or VBR network architectures. The RCBR and RVBR networks allow for the implementation of an intelligent data traffic management systems that are responsive to the rate at which new calls or requests for connections enter and leave the network, the frequency and duration of extended peak rate data bursts, as well as the occurrence of short duration data transmission peaks.

20 Claims, 3 Drawing Sheets

5,604,731

RENEGOTIATED BIT-RATE SERVICE SYSTEM AND METHOD

TECHNICAL FIELD

The invention relates to providing multiple-user access bit-rate service within a nonexclusive transmission network.

BACKGROUND OF THE INVENTION

With the advent of multimedia data and entertainment services, and the ever increasing popularity of the Internet, the importance of integrated services telecommunication networks ("ISNs") in the future communication infrastructure is fast becoming evident. Current designs for ISNs typically provide for three types of service: constant bit-rate ("CBR"), variable bit-rate ("VBR") and available bit-rate ("ABR"). Present ISN designs provide for CBR service compatible with existing circuit-switched telecommunication networks. Similarly, ABR service is being designed for compatibility with the Internet and Internet-style data transfer applications. However, design considerations with respect to VBR have been dictated by considerations for future telecommunication traffic, with a particular emphasis being placed upon the transmission of compressed video information. This type of video information is generally characterized as having an intrinsic long-term average data rate, punctuated with periods of peak rate data bursts. To facilitate the transmission of such bursty traffic via a standard CBR service network each data burst would have to be smoothed out or reduced via buffering prior to entering the network (causing intolerable delays for real time video signals), or the CBR rate would have to be set at some value that was very close to the peak data rate of the video information being sent (squandering network resources and thereby severely limiting signal multiplexing within the network). Similarly, if such bursty video information is transmitted via an ABR service network, there is no guarantee that the "available" network resources will be sufficient to avoid unacceptable data delays and/or losses. Present designs for VBR network services, such as those discussed by A. E. Eckberg in B-ISDB/ATM Traffic and Congestion Control, IEEE Network, September 1992, pages 28–37, essentially augment standard CBR service with the ability to accommodate moderate data bursts.

To ensure that bursty data transmissions can be carried by a VBR network without unacceptable data delays and/or losses it is essential that the VBR network be provided with an accurate characterization of the data that will be sent. This characterization is communicated to a VBR network via traffic descriptors transmitted along with the data. To maintain data transmission efficiency within a VBR network, it is desirable to provide an accurate characterization of the traffic being sent by using as few traffic descriptors as possible. In practice this has proven to be quite difficult— especially where the data being sent is compressed video.

Compressed video data simply does not conform to the "moderately bursty" traffic model envisaged by designers of VBR service networks. As is well known in the art, compressed video data typically includes fairly long intervals (on the order of tens of seconds) where the data rate is very near what would have been considered the peak rate for the typical VBR model (see E. P. Rathgeb, Policing of Realistic VBR Video Traffic in an ATM Network, International Journal of Digital and Analog Communications Systems, vol. 6, pages 213–26, 1993; M. W. Garrett and W. Willinger, Analysis Modeling and Generation of Self-Similar VBR Video Traffic, ACM Sigcomm '94, pages 269–80, University College London, August 1994). These extended high-rate data bursts are due to scenes depicting considerable motion and/or quickly varying light levels. For such traffic, if a leaky-bucket type of traffic descriptor is used, one is faced with a series of poor choices.

For example, assume that the video data traffic is being routed through the system illustrated in FIG. 1. As shown, video data is sent from network subscriber site 100 to remote user location 101 via VBR network 102. In response to signal from processor 103, data is transmitted from compressed video source 104 to VBR network 102 by way of source buffer 105 and regulator 106. Regulator 106 is a "leaky-bucket" data regulator, a type that is well-known in the art. This type of regulator allows data to be output at a particular rate as a function of the availability of data tokens (107) within token bucket register 108. Tokens are "placed" in token bucket register 108 at a predetermined rate, and depleted as data passes through regulator 106—When token bucket 108 is empty, no additional data is permitted to pass through regulator 106. These tokens are virtual in nature; that is, they only serve to meter data flow through regulator 106, and are not inserted into the outgoing data stream. If the token availability/data rate of regulator 106 is chosen so that the rate of data output from regulator 106 approximates the average data rate at which data leaves compressed video source 104 (a condition that will maximize the statistical multiplexing gain within VBR network 102), and if the size of token bucket register 108 (i.e., the maximum number of tokens that may be held in this register) is fixed at a moderate level (so as to avoid overloading VBR network 102), then source buffer 105 will have to be very large in order to support an extended high-rate data burst from compressed video source 104. Barring the availability of such a large source buffer, data losses will occur. Even if source buffer 105 is made large enough to handle such sustained bursts of peak video transmission, the result is still far from ideal— Data losses will be avoided, but, due to the large source buffer, equipment expenses increase and long delays will be experienced with respect to source output.

Alternatively, if token bucket register 108 is made large enough to allow token regulator 106 to rapidly drain source buffer 105 of data gluts resulting from sustained video data bursts, then large network and remote user location buffers (109, 110) will be needed to avoid data losses and ensure proper delivery of a usable video signal to receiver/viewer 111. Furthermore, by allowing such bursts to be freely drained and launched into VBR network 102 a single network subscriber site is given the ability to disrupt VBR network 102 by flooding it with tens of megabytes of data.

Thus, the phenomenon of sustained peaks of high-rate data will result in either high data losses, large delays between source and recipient, or a disruption-prone unregulated VBR network environment. Given the current framework of VBR network service, there is no clear way to avoid all of these problems simultaneously. This is a simple consequence of the fact that the sustained peaks exhibited in compressed video data violate the basic design assumptions for VBR service.

SUMMARY OF THE INVENTION

The aforementioned problems are solved, in accordance with the principles of the invention, by providing a data transmission system and method that employs either a renegotiated variable bit-rate ("RVBR") network or a renegotiated constant bit-rate ("RCBR") network. Within these networks, data transmission rates between a sender and a recipient are rapidly renegotiated as a function of previously stored data transmission rate information and system buffer levels. Such a system and method can be readily implemented within existing CBR and/or VBR network architectures. The RCBR and RVBR networks allow for the implementation of an intelligent data traffic management systems that are responsive to the rate at which new calls or requests for connections enter and leave the network, the frequency and duration of extended peak rate data bursts, as well as the occurrence of short duration data transmission peaks.

DETAILED DESCRIPTION OF THE INVENTION

Figure 1:
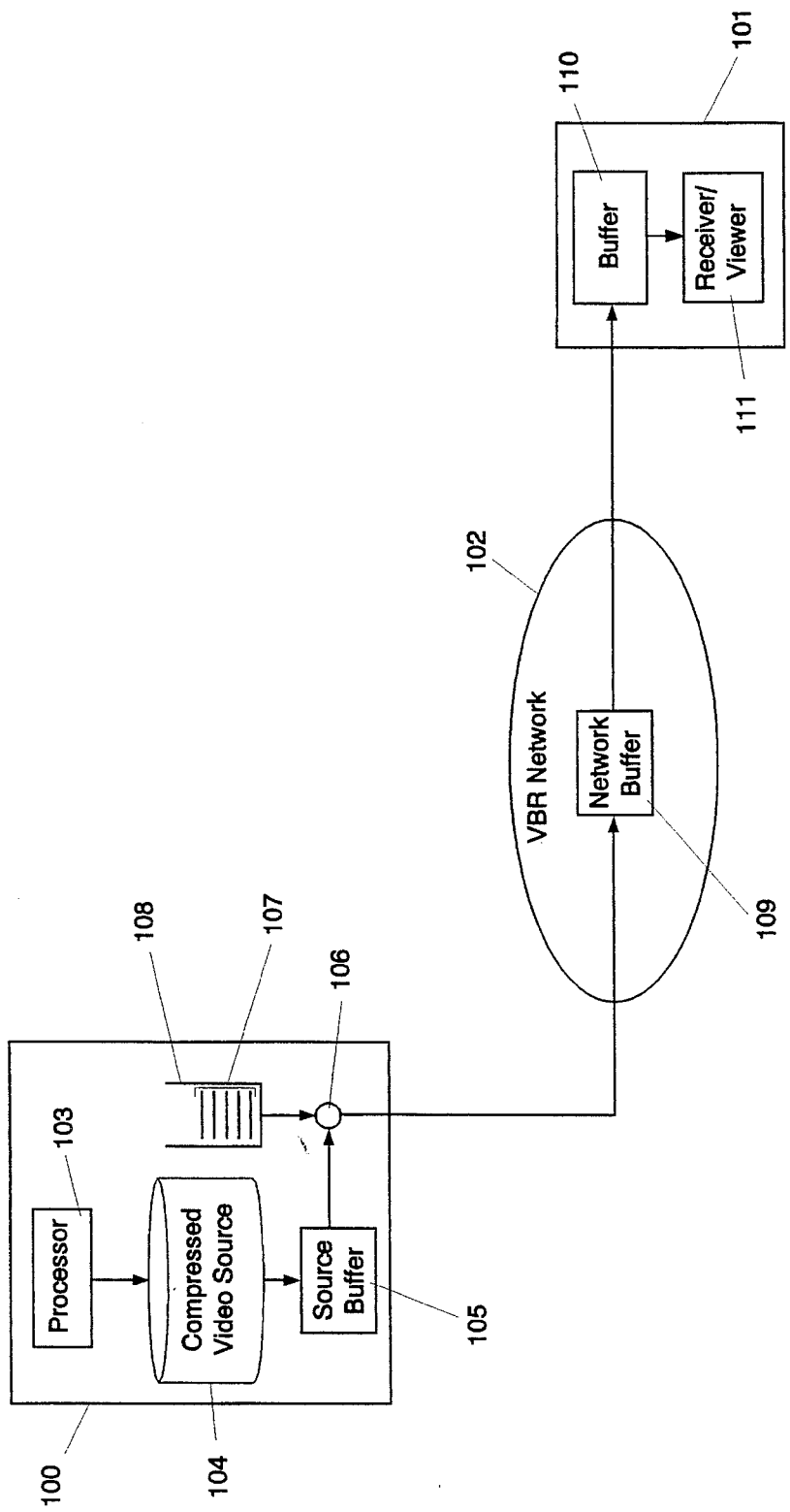
FIG. 1 shows, in simplified block diagram form, the architecture of a prior art VBR network data transmission system.
Figure 2:
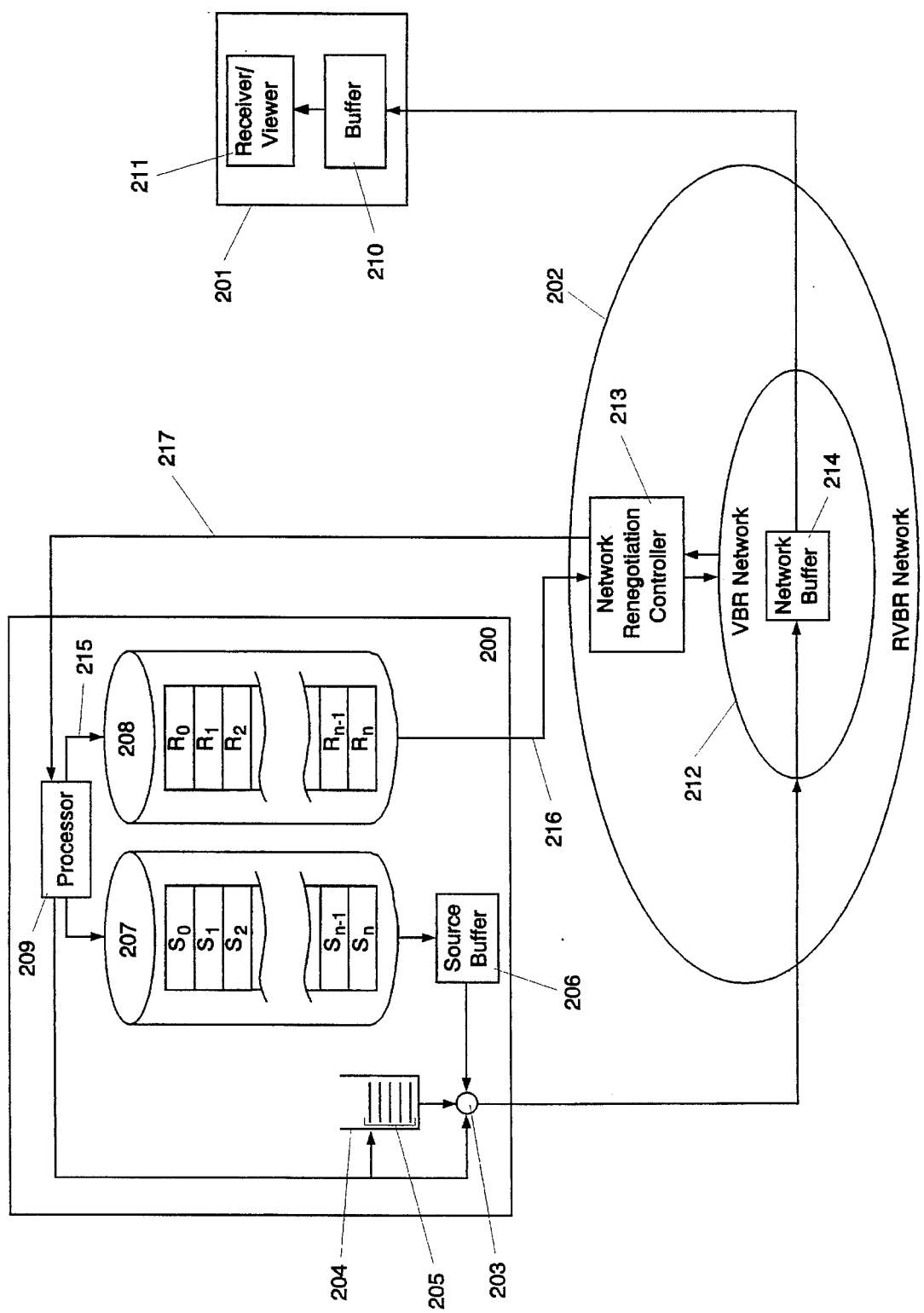
FIG. 2 shows, in simplified block diagram form, the architecture of a renegotiated VBR network including an exemplary embodiment of the invention.

FIG. 2 shows, in simplified form, the architecture of an RVBR network including an exemplary embodiment of the invention. The illustrated system comprises network subscriber site 200, remote user location 201, and RVBR network 202. As shown, network subscriber site includes leaky-bucket regulator 203, token bucket register 204, data tokens 205, source buffer 206, video source 207, video data transmission rate memory 208 and processor 209. Video source 207 contains a particular compressed video program that will be transmitted via RVBR Network 202 to remote user location 201. Video data transmission rate memory 208 contains a previously compiled record of the instantaneous transmission rates that will have to be maintained within RVBR network 202 in order to support the real time transmission of the compressed video program stored in video source 207. For example, to efficiently facilitate the transmission of a compressed video signal representing a typical movie, it will most likely be necessary to alter the transmission rate within RVBR network 202 every few seconds (due to varying levels of motion and/or light from scene to scene). Therefore, the record of the instantaneous transmission rates stored in memory 208 consists of a listing of rates, $R_0$ through $R_n$, each of which is indexed to a specific segment ($S_0$ through $S_n$) of the particular compressed video program stored within video source 207. Also, as shown in FIG. 2, RVBR network 202 consists of a conventional VBR network (212), which is managed by network renegotiation controller 213. RVBR network 202 is also shown to include buffer 214. Remote user location 201 is shown to include buffer 210 and receiver/viewer 211.

In operation, a signal from processor 209 serves to initiate the transmission of a particular compressed video data program from video source 207 to remote user location 201. This processor signal may be generated in response to a user request (as would be the case for interactive, request, or pay-per-view video systems), or the signal may be generated by processor 209 according to a predetermined timetable. The initiating signal is transmitted to video data transmission rate memory 208 via line 215. In response, the rate value $R_0$ (associated with the initial segment, $S_0$, of the particular compressed video data program stored within video source 207) is transmitted from video data transmission rate memory 208 to network renegotiation controller 213. The transmission of $R_0$ serves as a request for obtaining a connection within RVBR network 202 capable of supporting a data transmission of $R_0$ bits per second ("bps") between network subscriber site 200 and remote user location 201. Communications between video data transmission rate memory 208 and network renegotiation controller 213 are effected via out-of-band signaling connection 216. Systems facilitating out-of-band signaling between network subscriber sites and network controllers are well known in the art.

The operation of negotiating the requested $R_0$ transmission bandwidth within RVBR network 202 is performed by network renegotiation controller 213. This negotiation is similar to those performed at the initiation of call connections within ordinary VBR networks. A network switching system (in this case, network renegotiation controller 213) compares an incoming request for transmission bandwidth with available network resources. If the resources are available, the request is accepted, and the requesting subscriber is granted network access. If the request exceeds current network resources, the subscriber is denied access. Any one of a number of commercially-available programmable telecommunication network switching systems would be suitable to serve as network renegotiation controller (213 ) within the system of FIG. 2. An example of one such switching system is the 4 ESS™ switch manufactured by AT&T Corp., and described in The Bell System Technical Journal, Vol. 56, No. 7, September 1977. Of course, there is a finite period, $t_{neg}$, required to receive a request, perform a bandwidth negotiation in response to that request, and establish network access for the requesting subscriber. Employing currently available switching systems, such as the 4 ESS™, within the system of FIG. 2 would result in $t_{neg}$ being on the order of 50 ms.

Assuming the $R_0$ request for bandwidth is successful, network renegotiation controller 213 transmits a confirmation signal to processor 209 via signaling connection line 217. This confirmation signal will arrive at processor 209 at time of approximately $t_0+t_{neg}$; where $t_0$ is the time at which the $R_0$ rate request was transmitted from video data transmission rate memory 208 to network renegotiation controller 213. Upon receipt of this confirmation, processor 209 adjusts the leaky-bucket regulator 203 and the amount of data tokens (205) within token bucket register 204 for the negotiated data rate. Processor 209 then instructs video source 207 to transmit data segment $S_0$ from network subscriber site 200 to remote user location 201.

At a time which is approximately $t_{neg}$ prior to the completion of the transmission of segment $S_0$, video data transmission rate memory 208 is instructed by processor 209 to transmit the rate value $R_1$ (associated with the compressed video segment $S_1$) to network renegotiation controller 213. This transmission of $R_1$ serves as a request for a connection within RVBR network 202 to support a data transmission of $R_1$ bps—The rate required to successfully transmit compressed video segment $S_1$. Assuming this request is successful, processor 209 receives a confirmation signal via signaling connection 217. In response, processor 209 adjusts leaky-bucket regulator 203 and token bucket register 204 accordingly, and then instructs video source 207 to transmit data segment $S_1$ from network subscriber site to remote user location 201.

This request/negotiate/confirm/adjust/transmit sequence is repeated until all n segments of the compressed video program stored within video source 207 have been transmitted to remote user location 201.

RVBR network 202 is not assumed to be reserved for the exclusive use of any one user. Consequently, demands put upon the resources of RVBR network 202 by the simultaneous transmission of data between many subscribers and users will almost inevitably lead to the denial of one or more requests for bandwidth. If a request for bandwidth does fail, the system of FIG. 2 can be programmed to respond in one of three ways.

1) Reduction of the rate of compressed video data transmitted from video source 207. Upon determination by network renegotiation controller 213 that the requested transmission rate is beyond the present capabilities of RVBR network 202, network renegotiation controller 213 requests a reduced transmission rate through RVBR network 202. When a successful reduced rate has been negotiated, a signal indicative of such is transmitted to processor 209 via signaling connection 217. In response, processor 209 instructs video source 207 to reduce the compressed video data transmission rate (leaky-bucket regulator 203 and token bucket register 204 are also adjusted accordingly). This data rate reduction can be accomplished by degrading the video resolution and/or decreasing the video frame rate. Both of which result in the transmission of a lower quality video signal to remote user location 201. The degraded level of video transmission will continue at least until the completion of the next bandwidth negotiation sequence.

2) Reduction of the rate of video data transmitted through RVBR network 202. In this scenario, when a particular transmission rate request fails, network renegotiation controller 213 requests a reduced transmission rate through RVBR network 202. However, when a successful reduced rate has been negotiated, processor 209 does not instruct video source 207 to reduce the compressed video data transmission rate. However, in response to a signal indicative of the request failure, processor 209 adjusts leaky-bucket regulator 203 and token bucket register 204 to the particular data rate that RVBR network 202 will accommodate. Consequently, video source 207 transmits the next segment of compressed video data at the requested rate. As RVBR 202 is incapable of supporting such a transmission, video data will accumulate in source buffer 206. This accumulated data will be transmitted to remote user location 201 at whatever rate RVBR can support. Assuming source buffer 206 is large enough to handle the incoming volume of data from video source 207, there should be no loss of data as a result, just a delay in its reception at remote user location 201. Due to the danger of data loss if source buffer 206 is at or near capacity, processor 209 can be programmed so that the above described routine is only executed when source buffer 206 is relatively empty.

3) The connection is terminated and/or not established. This most extreme option would usually be viewed as an undesirable result. However, the system of FIG. 2 could be programmed so that upon the failure of a request for bandwidth, the connection between network subscriber site 200 and remote user location 201 is simply terminated or never established (in the case where the failed request was the initial request for connection).

Figure 3:
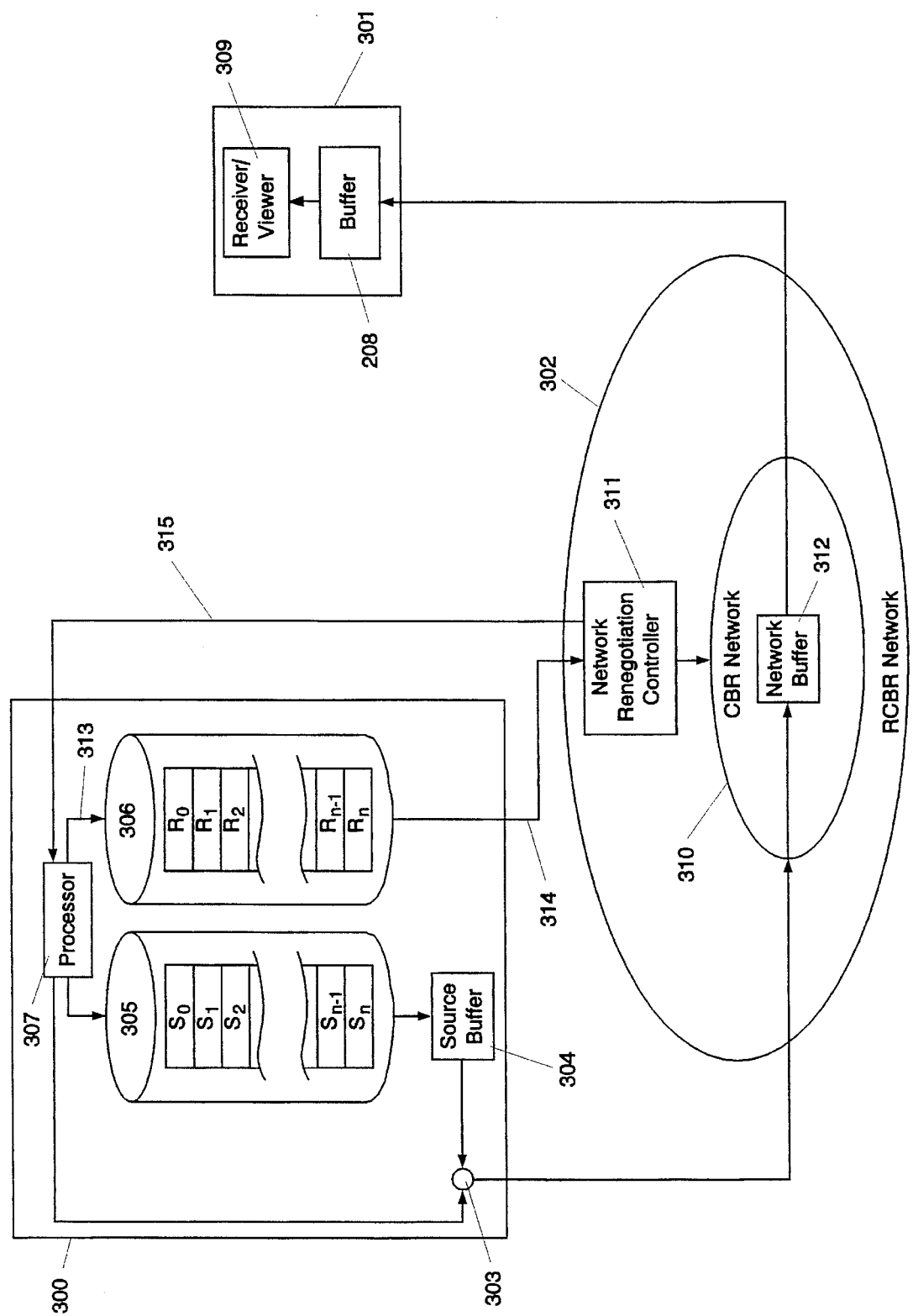
FIG. 3 shows, in simplified block diagram form, the architecture of a renegotiated CBR network including an alternate embodiment of the invention.

FIG. 3 shows, in simplified form, the architecture of an RCBR network including an alternate embodiment of the invention. The illustrated system comprises network subscriber site 300, remote user location 301, and RCBR network 302. As shown, network subscriber site includes data regulator 303, source buffer 304, video source 305, video data transmission rate memory 306 and processor 307. Video source 305 and video data transmission rate memory 306 contain compressed video and transmission rate data, respectively. This data has a format similar to that described for video source 207 and video data transmission rate memory 208 of FIG. 2. Also, as shown in FIG. 3, RCBR network 302 consists of a conventional CBR network (310), managed by network renegotiation controller 311. RCBR network 302 is also shown to include buffer 312. Remote user location 301 includes buffer 308 and receiver/viewer 309.

The operation of the system of FIG. 3 is similar to that of the system of FIG. 2—An initiating signal is transmitted from processor 307 to video data transmission rate memory 306 via line 313. In response, the rate value $R_0$ (associated with the $S_0$ segment of the particular compressed video data program stored within video source 305) is transmitted from video data transmission rate memory 306 to network renegotiation controller 311 via out-of-band signaling connection 314. The transmission of $R_0$ serves as a request for obtaining a connection within RCBR network 302 capable of supporting a data transmission of $R_0$ bps between network subscriber site 300 and remote user location 301.

Network renegotiation controller 311 performs the operation of negotiating the requested $R_0$ transmission bandwidth within RCBR network 302. This negotiation is similar to those performed at the initiation of call connections within ordinary CBR networks. If the network resources are available, the request is accepted, and the requesting subscriber is granted network access. If the request exceeds current network resources, the subscriber is denied access. As with the system of FIG. 2, any one of a number of commercially-available programmable telecommunication network switching systems (such as the 4 ESS) would be suitable to serve as network renegotiation controller. The time required to receive a request, perform a bandwidth negotiation, and establish network access for the requesting subscriber is referred to as $t_{neg}$ (typically on the order of 50 ms).

Assuming the $R_0$ request for bandwidth is successful, network renegotiation controller 311 transmits a confirmation signal to processor 307 via signaling connection line 315. This confirmation signal will arrive at processor 307 at time of approximately $t_0+t_{neg}$; where $t_0$ is the time at which the $R_0$ rate request was transmitted from video data transmission rate memory 306 to network renegotiation controller 311. Upon receipt of this confirmation, processor 307 instructs video source 305 to transmit data segment $S_0$ from network subscriber site 300 to remote user location 301.

At a time which is approximately $t_{neg}$ prior to the completion of the transmission of segment $S_0$, video data transmission rate memory 306 is instructed by processor 307 to transmit the rate value $R_1$ (associated with the compressed video segment $S_1$) to network renegotiation controller 311. This transmission of $R_1$ serves as a request for a connection within RCBR network 302 to support a data transmission of $R_1$ bps—The rate required to successfully transmit compressed video segment $S_1$. Assuming this request is successful, processor 307 receives a confirmation signal via signaling connection 315, and, in response, instructs video source 305 to transmit data segment $S_1$ from network subscriber site 300 to remote user location 301.

This request/negotiate/confirm/transmit sequence is repeated until all n segments of the compressed video program stored within video source 305 have been transmitted to remote user location 301.

Demands put upon the resources of RCBR network 302 by the simultaneous transmission of data between many subscribers and users can lead to the denial of one or more requests for bandwidth, and the system of FIG. 3 can be programmed to respond in one of three ways to a failure of a request for bandwidth.

Reduction of the rate of compressed video data transmitted from video source 305. If network renegotiation controller 311 determines that the requested transmission rate is beyond the present capabilities of RCBR network 302, network renegotiation controller 311 requests a reduced transmission rate through RCBR network 302. When a successful reduced rate has been negotiated, a signal indicative of such is transmitted to processor 307 via signaling connection 315. In response, processor 307 instructs video source 207 to reduce the compressed video data transmission rate (data regulator 303 is also adjusted accordingly). This data rate reduction can be accomplished by degrading the video resolution and/or decreasing the video frame rate. The degraded level of video transmission will continue at least until the completion of the next bandwidth negotiation sequence.

2) Reduction of the rate of video data transmitted through RCBR network 302. When a transmission rate request fails, network renegotiation controller 213 requests a reduced transmission rate through RCBR network 302. However, when a successful reduced rate has been negotiated, processor 307 does not instruct video source 305 to reduce the compressed video data transmission rate. However, in response to a signal indicative of the request failure, processor 307 adjusts data regulator 303 to the data rate that RCBR network 302 will accommodate. Consequently, video source 305 transmits the next segment of compressed video data at the requested rate. As RCBR 302 is incapable of supporting such a transmission, video data will accumulate in source buffer 304. This accumulated data will be transmitted to remote user location 301 at whatever rate RCBR can support. Assuming source buffer 304 is large enough to handle the incoming volume of data from video source 305, there should be no loss of data as a result, just a delay in its reception at remote user location 301.

3) The connection is terminated and/or not established. This most extreme option would usually be viewed as an undesirable result. However, the system of FIG. 3 could be programmed so that upon the failure of a request for bandwidth, the connection between network subscriber site 300 and remote user location 301 is simply terminated or never established (in the case where the failed request was the initial request for connection).

It will be understood that the particular embodiments and methods described above are only illustrative of the principles of the present invention, and that various modifications could be made by those skilled in the art without departing from the scope and spirit of the present invention, which is limited only by the claims that follow. For example, one such modification would include employing the invention within a private network, or applying the invention to networks that are adapted to transmit digital data that represents information other than compressed video. Another modification would be applying the invention to RVBR and/or RCBR networks where connections between a single subscriber site and a plurality of remote user locations are effected simultaneously (i.e., a single video program is "broadcast" to a number of recipients).

We claim:

1. A data transmission system comprising:

a first site;

a second site;

a variable bit-rate network providing a connection between said first and said second sites;

a first memory storing a series of data segments;

a second memory storing a previously compiled record of instantaneous transmission rates, each of said stored rates being associated with one or more of said stored data segments; and a network controller adapted to negotiate a connection between said first site and said second site having a particular bandwidth in response to the contents of said second memory.

2. The invention of claim 1 wherein said series of data segments represent a video signal.

3. The invention of claim 2 wherein each of said stored rates within said second memory represents the instantaneous transmission rate that would be required to support the transmission of said series of data segments so that the represented video signal is received at said second site in real-time.

4. The invention of claim 1 wherein said network controller is further adapted to negotiate a connection at an alternate bandwidth within said variable bit-rate network, if said initial negotiation for a connection between said first site and said second site in response to contents of said second memory fails.

5. The invention of claim 1 further comprising:

a data memory adapted to buffer data flowing from said first memory to said variable bit-rate network.

6. The invention of claim 5 wherein said network controller is further adapted to negotiate a connection at an alternate bandwidth within said variable bit-rate network, if said initial negotiation for a connection between said first site and said second site in response to contents of said second memory fails, wherein said alternate rate is a function of the contents of said data memory.

7. A data transmission system comprising:

a first site;

a second site;

a constant bit-rate network providing a connection between said first and said second sites;

a first memory storing a series of data segments;

a second memory storing a previously compiled record of instantaneous transmission rates, each of said stored rates being associated with one or more of said stored data segments; and a network controller adapted to negotiate a connection between said first site and said second site having a particular bandwidth in response to the contents of said second memory.

8. The invention of claim 7 wherein said series of data segments represent a video signal.

9. The invention of claim 8 wherein each of said stored rates within said second memory represents the instantaneous transmission rate that would be required to support the transmission of said series of data segments so that the represented video signal is received at said second site in real-time.

10. The invention of claim 7 wherein said network controller is further adapted to negotiate a connection at an alternate bandwidth within said constant bit-rate network, if said initial negotiation for a connection between said first site and said second site in response to contents of said second memory fails.

11. The invention of claim 7 further comprising:
a data memory adapted to buffer data flowing from said first memory to said constant bit-rate network.

12. The invention of claim 11 wherein said network controller is further adapted to negotiate a connection at an alternate bandwidth within said constant bit-rate network, if said initial negotiation for a connection between said first site and said second site in response to contents of said second memory fails, wherein said alternate rate is a function of the contents of said data memory.

13. A method for effecting a transmission between a first site and a second site via a variable bit-rate network, comprising the steps of:

providing a connection between said first and said second sites via said variable bit-rate network;

storing a series of data segments within a first memory;

retrieving from a second memory a value of an instantaneous data transmission rate, said stored rate being associated with one or more of data segments that are transmitted;

negotiating a particular bandwidth connection via said variable bit-rate network in response to a said retrieved instantaneous data rate value; and transmitting said one or more data segments associated with said retrieved instantaneous data rate value between said first site and said second site via said variable bit-rate network.

14. The method of claim 13 wherein said series of data segments represent a video signal.

15. The method of claim 14 wherein said transmission of said one or more data segments between said first site and said second sites via said variable bit-rate network results in the reception of said represented video signal at said second site in real-time.

16. The method of claim 13, further comprising the step of:

negotiating a connection at an alternate bandwidth within said variable bit-rate network, upon the failure of said initial negotiation for a connection at a particular bandwidth in response to a said retrieved instantaneous data rate value.

17. A method for effecting a transmission between a first site and a second site via a constant bit-rate network, comprising the steps of:

providing a connection between said first and said second sites via said constant bit-rate network;

storing a series of data segments within a first memory;

retrieving from a second memory a value of an instantaneous data transmission rate, said stored rate being associated with one or more of data segments that are transmitted;

negotiating a particular bandwidth connection via said constant bit-rate network in response to a said retrieved instantaneous data rate value; and transmitting said one or more data segments associated with said retrieved instantaneous data rate value between said first site and said second site via said constant bit-rate network.

18. The method of claim 17 wherein said series of data segments represent a video signal.

19. The method of claim 18 wherein said transmission of said one or more data segments between said first site and said second sites via said constant bit-rate network results in the reception of said represented video signal at said second site in real-time.

20. The method of claim 17, further comprising the step of:

negotiating a connection at an alternate bandwidth within said constant bit-rate network, upon the failure of said initial negotiation for a connection at a particular bandwidth in response to a said retrieved instantaneous data rate value.

* * * * *